United States Patent [19]

Hartmann

[11] 4,168,509

[45] Sep. 18, 1979

[54] METHOD FOR TRANSMITTING AND RECEIVING COMPATIBLE HIGH RESOLUTION TELEVISION PICTURES

[75] Inventor: Clinton S. Hartmann, Richardson, Tex.

[73] Assignee: Texas Instruments Incorporated, Dallas, Tex.

[21] Appl. No.: 832,148

[22] Filed: Sep. 12, 1977

[51] Int. Cl.² .................................................. H04N 3/00
[52] U.S. Cl. ......................................... 358/138; 358/83
[58] Field of Search ...................................... 358/138, 83

[56] References Cited

U.S. PATENT DOCUMENTS

| 2,921,124 | 1/1960 | Graham | 358/138 |
| 4,127,873 | 11/1978 | Katagi | 358/138 |

Primary Examiner—Howard W. Britton
Attorney, Agent, or Firm—Melvin Sharp; Richard L. Donaldson; William E. Hiller

[57] ABSTRACT

A method for transmitting and receiving high resolution television pictures is disclosed. Each frame of the pictures is comprised of scan lines having frequency components from 0 to $f_{MAX}$ where $f_{MAX}$ is $\geq$ the bandwidth BW of the conventional television system. Frames are transmitted and received via analog video signals $f_k(t)$ which are formed from selected samples of predetermined scan lines. Each of the analog video signals has a frequency spectrum of width less than BW. High resolution televisions receive the video signals $f_k(t)$ and extract the selected samples therefrom. The samples are then recombined to form high resolution pictures. Conventional television receivers use the analog video signals $f_k(t)$ as common analog video scan line signals in the usual manner.

21 Claims, 28 Drawing Figures

METHOD FOR TRANSMITTING AND RECEIVING COMPATIBLE HIGH RESOLUTION TELEVISION PICTURES

BACKGROUND OF THE INVENTION

This invention relates to methods for transmitting and receiving high resolution television pictures, and more particularly to methods for transmitting and receiving high resolution television pictures via signals which are compatible with presently existing moderate resolution television sets and present channel bandwidths. By utilizing the disclosed methods, conventional televisions receive the same quality pictures as they presently do, while modified sets receive pictures at a much higher resolution.

The problem of transmitting/receiving high resolution television pictures is long standing and has many aspects. In particular, one aspect of the problem is that the electromagnetic frequency spectrum must be shared with many non-television uses. Thus, the bandwidth for video signals in domestic television has been limited by government regulation to approximately 4.2 MHz. And the conventional method for transmitting/receiving television pictures limits the resolution of the pictures to the bandwidth of this channel.

Another aspect of the problem of receiving high resolution pictures is that conventionally, an increased resolution requires that the bandwidth of the television's RF and IF and video stages be increased. This, however, is undesirable because an increased bandwidth in the RF and IF stages makes the receiver more susceptible to noise. Accordingly, present television receivers typically do not use the entire 4.2 MHz bandwidth of the electromagnetic frequency spectrum. Instead, most television receivers have a composite RF/IF/video bandwidth of only approximately 3 MHz.

Additionally, there are cost performance tradeoffs which make it impractical to achieve the full 4.2 MHz video bandwidth at a reasonable cost. Technically a full 4.2 MHz video signal could probably be transmitted/received with currently emerging technologies such as SWD's, CCD's and UHF IC's. But the increase in performance which is achieved between displaying signals of 3.0 MHz versus signals of 4.2 MHz is probably too marginal to justify the added expense. What is needed is a method for achieving much more significant improvements in the picture resolution (i.e., -double or triple the resolution).

In the prior art, various methods have been devised for transmitting high resolution television pictures over a narrow band channel. However, the signals which are transmitted in these methods are not compatible with present commercial television receivers. For example, one such method for transmitting high resolution pictures over a narrow channel is known as delta modulation. In delta modulation, the video signals which are transmitted contain information indicating the difference between the light intensity of successive frames. Accordingly, in a still scene, the light intensity from frame to frame is relatively constant, and thus the bandwidth of the video signals is small. However, these video signals are clearly not compatible for use within present television receivers for home use.

It is therefore one object of the invention to provide a method for transmitting/receiving high resolution television pictures via signals which are compatible with presently existing commercial television.

Another object of the invention is to provide a method of transmitting/receiving television pictures having a resolution of at least double the resolution of present commercial television pictures.

Another object of the invention is to provide a method of transmitting/receiving television pictures having frequency components which are greater than the bandwidth of the electromagnetic frequency spectrum over which they are transmitted.

Still another object of the invention is to provide a method of transmitting/receiving high resolution television pictures which is operable in a television receiver having a relatively narrow bandwidth RF/IF stage.

SUMMARY OF THE INVENTION

These and other objects are accomplished in accordance with the invention by a method of transmitting television pictures which includes the following steps. Each pair of adjacent original scan lines is replaced by M new scan lines where $M \geq 2$. Then, predetermined ones of the M new scan lines are sampled to obtain samples $s(kT_s)$, $s(kT_s+NT_s)$, ... where the k is an integer between 1 and N. N is chosen such that it is greater than or equal to $f_{MAX} \div BW$. The frequency $f_{MAX}$ is the picture largest frequency component of the which is to be desired to be transmitted. BW equals the bandwidth of the channel; and $T_s$ is chosen such that $1/T_s$ is greater than or equal to $2f_{MAX}$. From these samples, an analog signal $f_k(t)$ is generated having an amplitude at the sample points $kT_s$, $kT_s+NT_s$, ... equal to the amplitude of the samples $s(kT_s)$, $s(kT_s+NT_s)$, $s(kT_s+2NT_s)$, ... respectively. The bandwidth of this signal is less than or equal to the bandwidth BW of the channel. Signal $f_k(t)$ is then modulated and transmitted as the video signal of one scan line. The above steps are repeated until all of the samples within one frame are transmitted. Additional frames are transmitted in a similar manner. In order to receive the high order resolution pictures, the process of transmission is basically reversed. That is, for each video signal $f_k(t)$ which is transmitted, the same signal is again sampled in the receiver at points $kT_s$, $kT_s+NT_s$, $kT_s+2NT_s$, ... in order to recover the samples. The receiving set then generates the light intensity of the picture at the sample points proportional to the amplitude of the respective samples. Conventional television sets also receive the analog signals $f_k(t)$, but treat then as conventional signals instead of recovering the transmitted samples.

BRIEF DESCRIPTION OF THE DRAWINGS

The novel features believed characteristic of the invention are set forth in the appended claims; the invention itself, however, as well as other features and advantages thereof may best be understood be referring to the following detailed description when read in reference to the accompanying drawings wherein:

DETAILED DESCRIPTION

Figure 1A:
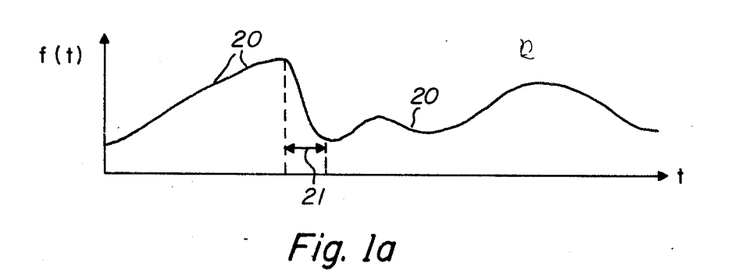
FIGS. 1a–1i are a set of frequency/timing diagrams illustrating one method of transmitting one scan line according to the invention.

Referring now to FIGS. 1a-1i, a portion of the method of transmitting high resolution television pictures in accordance with the invention is illustrated. FIG. 1a is a timing diagram of a video signal f(t), herein assigned reference numeral 20, which comprises one scan line of the picture that is desired to be transmitted. In present U.S. television systems, there are a total of 525 scan lines per picture. These scan lines are sequentially numbered from top to bottom of the picture, and are divided into two scan line sets. One of the sets contains scan lines 1, 3, 5, . . . ; while the other set contains scan lines 2, 4, 6, . . . . These two sets are alternately transmitted to form picture frames. The scan line set transmission rate is 60 Hz, which results in a frame rate of 30 Hz.

In FIG. 1a, the amplitude of signal f(t) is proportional to the brightness of the scene being transmitted. Accordingly, signal f(t) has a steep slope when the brightness of the scene being transmitted quickly changes from dark to light, or vice versa. Such a change in intensity is illustrated in FIG. 1a as occurring during the time interval 21 as an example. In a still scene, these brightness changes are due entirely to intensity changes between adjacent objects of portions thereof. In a scene with moving objects, the same is true, since a television picture is comprised of a series of still frames.

Figure 1B:
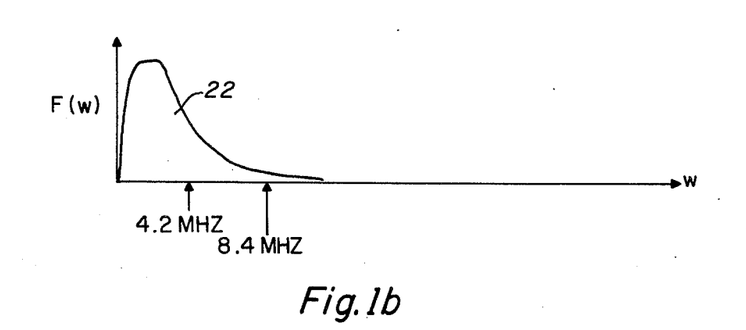

The rate at which signal f(t) changes is important because a high rate of change gives rise to high frequency components. FIG. 1b illustrates the frequency spectrum F(w), herein assigned reference numeral 22, of signal f(t) as an example. Typically, the majority of the frequency components of the signal of FIG. 1a are less than 4.2 MHz. However, a significant portion of the frequency components lie above 4.2 MHz. The reference point of 4.2 MHz is given herein as an example of a channel bandwidth. In general, signal f(t) is comprised of frequency components greater than the bandwidth BW of the system, and frequencies 0 through $f_{MAX}$ of these frequencies are desired to be transmitted where $f_{MAX} > BW$.

Figure 1C:
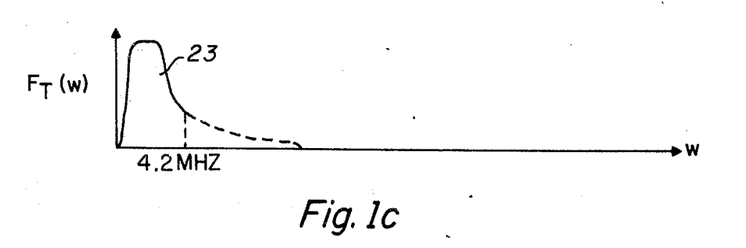

For comparison purposes, FIG. 1c illustrates the conventional method of transmitting video signals. As therein illustrated, the high frequency components are filtered from signal F(w) and thus a truncated frequency spectrum $F_T(w)$, which is herein labeled 23, is generated. The bandwidth of truncated frequency spectrum 23 is purposely made less than the bandwidth BW of the television system in order that it may be transmitted through the system. However, due to the truncation, the corresponding time signal $f_t(t)$ has a smooth slope. Accordingly, the picture which is generated by a television in response to signal $f_t(t)$ has no sharp transitions from bright to dark or vice versa. In other words, the picture has poor resolution.

Figure 1D:
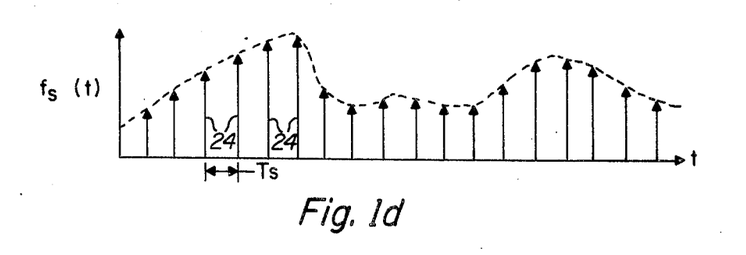

Referring now to FIG. 1d, a plurality of samples $f_s(t)$ are illustrated, and are labeled as 24. These samples are equally spaced in time by an interval $T_s$, and have a magnitude equal to that of the signal f(t) at the corresponding sampling time instant. Time interval $T_s$ is the reciprocal of a frequency $f_s$, where $f_s$ is $\geq 2$ times the maximum frequency of the frequency spectrum of the video signal to be transmitted. For example, the frequency spectrum of FIG. 1b is illustrated as having a maximum frequency for transmission of 8.4 MHz, and accordingly $f_s$ for this example is $\geq 16.8$ MHz. Samples taken at the time instants $T_s$, $2T_s$, $3T_s$, . . . are herein notated as $s(T_s)$, $s(2T_s)$, $s(3T_s)$ . . . respectively.

Figure 1E:
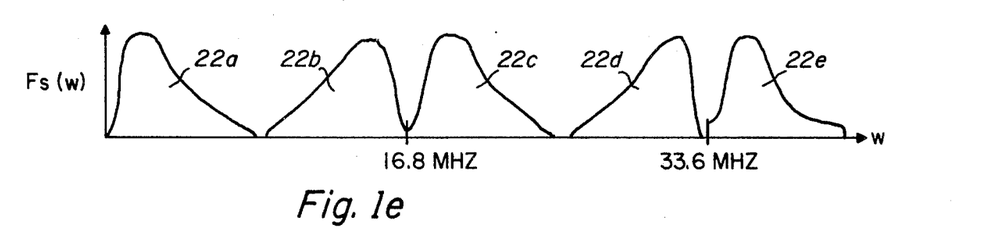

A frequency spectrum $F_s(w)$ of samples $f_s(t)$ is illustrated in FIG. 1e. Frequency spectrum $F_s(w)$ is comprised of a plurality of the F(w) frequency spectrums 22a, 22b, . . . which are spaced about multiples of the frequency $f_s$. The multiple F(w) spectrums do not overlap however, since the frequency $f_s$ is $\geq 2f_{MAX}$. The information contained in any of the frequency spectrums 22a, 22b, . . . is sufficient to permit signal f(t) to be reproduced in a television and thereby obtain a high resolution video picture. However, each of the frequency spectrums 22a, 22b, . . . has a bandwidth of $f_{MAX}$, which is greater than the bandwidth of the system. By comparison, the method described herein generates signals $f_k(t)$ from the samples $f_s(t)$ which have frequency spectrums that pass through the bandwidth of the television system, and from which signal f(t) is reconstructable.

Figure 1F:
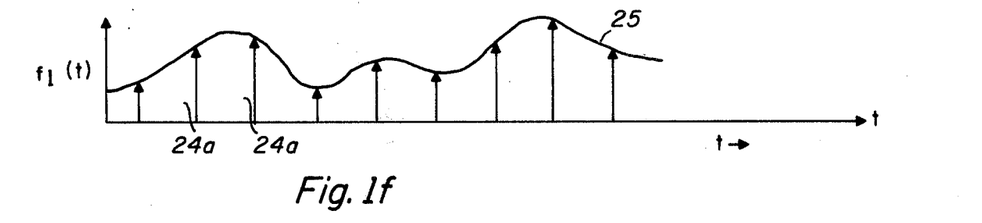
Figure 1G:
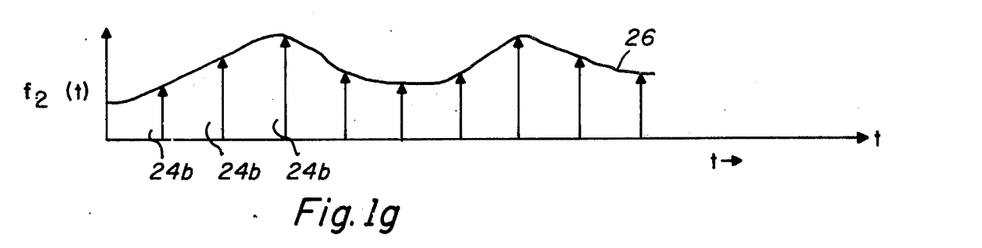

To this end, samples $f_s(t)$ are divided into N horizontal interlace sets. The samples of any one horizontal interlace set are defined by $s(kT_s)$, $s(kT_s+NT_s)$, $s(kT_s+2NT_s)$, . . . where k is an integer between 1 and N, and N is $\geq f_{MAX} \div BW$. FIGS. 1f and 1g illustrate how the sample of FIG. 1d would be divided into horizontal interlace sets as an example. In this example, $f_{MAX}=8.4$ MHz, and BW, the bandwidth of the television system is 4.2 MHz. Accordingly, $N \geq 8.4/4.2$ which equals 2. FIG. 1f illustrates the horizontal interlace set of samples $s(kT_s)$, $s(kT_s+NT_s)$, $s(kT_s+2NT_s)$, . . . for k=1, while FIG. 1g illustrates the horizontal interlace set of samples for k=2. These samples are indicated in FIGS. 1f and 1g by reference numerals 24a and 24b respectively.

Each of the N sets of samples is then utilized to form analog signals $f_k(t)$ where k=1, 2, . . . N, such that the amplitude of signal $f_k(t)$ equals the amplitude of the $k_{th}$ set of horizontal interlace samples at the sample points. For example, the samples of FIG. 1f are utilized to generate an analog signal $f_1(t)$ having an amplitude at time instants $T_s$, $3T_s$, $5T_s$, . . . equal to the amplitude of the samples at the same time instants. Similarly, the samples of FIG. 1g are utilized to generate an analog signal $f_2(t)$ having an amplitude at the sampling time instants $2T_s, 4T_s, 6T_s, \ldots$ equal to the amplitude of the samples at the corresponding time instants. Signals $f_1(t)$ and $f_2(t)$ are indicated in FIGS. 1f and 1g as 25 and 26 respectively.

The analog signals $f_1(t)$ and $f_2(t)$ as generated above have a bandwidth which is less than or equal to the bandwidth of the system. This criterion is met in accordance with the above described method, since the maximum frequency component of $f_k(t)$ is $f_{MAX} \div N$. But N is defined as being $\geq f_{MAX} \div BW$. Thus by definition, $BW \geq f_{MAX} \div N$.

Figure 1H:
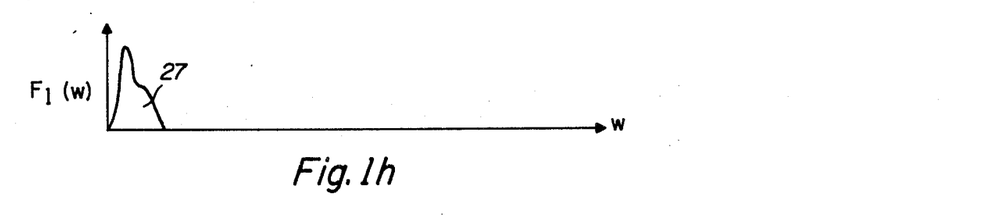
Figure 1I:
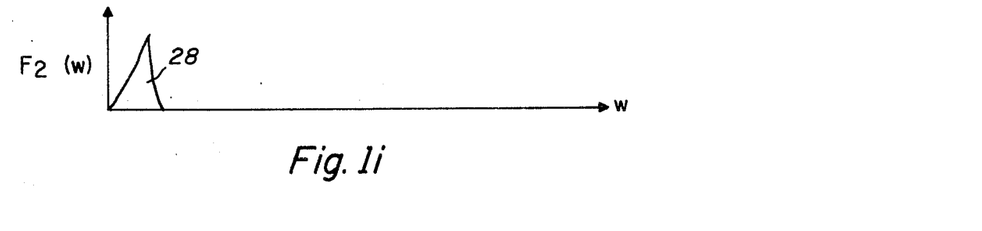

One suitable method for generating analog signals $f_1(t)$ and $f_2(t)$ is to pass the corresponding samples through an interpolating filter having a sine x/x impulse response. FIGS. 1h and 1i illustrate the frequency spectrums 27 and 28 of the analog signals $f_1(t)$ and $f_2(t)$ respectively. As therein illustrated, each of these frequency spectrums has a bandwidth which is less than the bandwidth of the television system. In accordance with the invention, signals $f_1(t)$ and $f_2(t)$ are then modulated and transmitted in a time multiplexed fashion over a channel of bandwidth BW. The receiving set then resamples the time multiplexed signals to recover the samples, and reverses the time multiplexing process by interleaving the samples derived from signals $f_1(t)$ and $f_2(t)$ in a manner to recreate signal $f_s(t)$. Signal f(t) is then reconstructable from signal $f_s(t)$. One method of frames from signals $f_k(t)$ will now be described in conjunction with FIG. 2f.

Figure 2A:
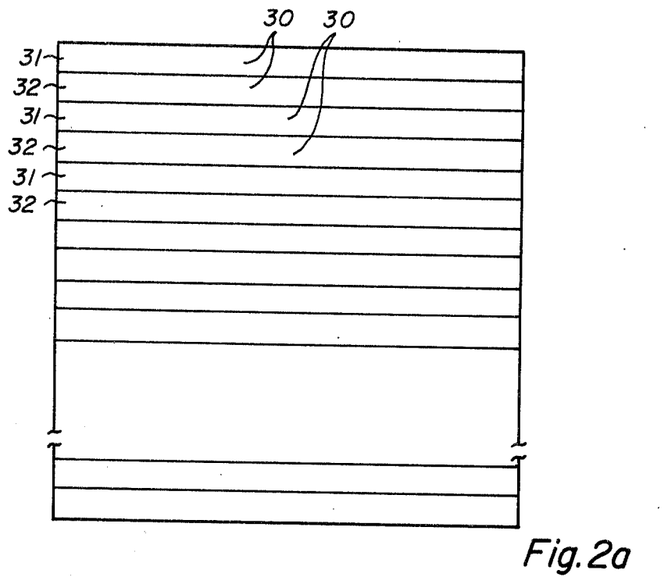
FIGS. 2a–2f are a set of diagrams illustrating the method of transmitting frames of pictures according to one preferred embodiment of the invention.
Figure 2B:
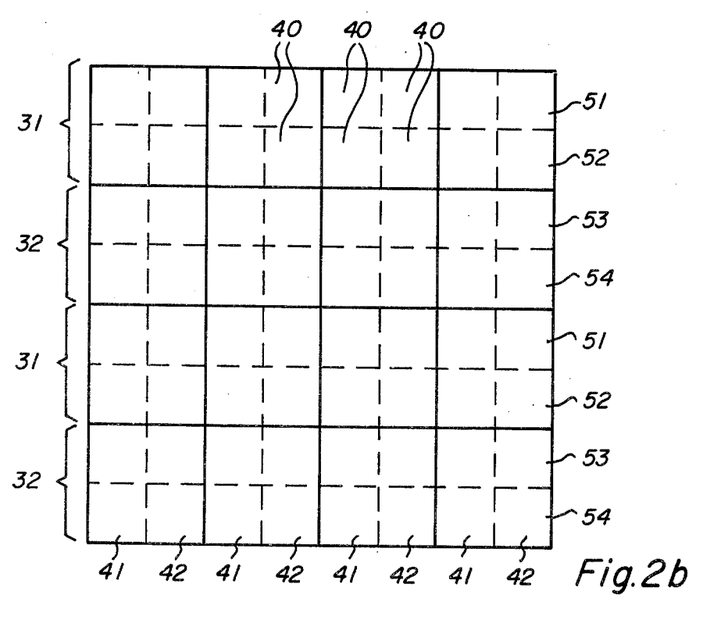
Figure 2C:
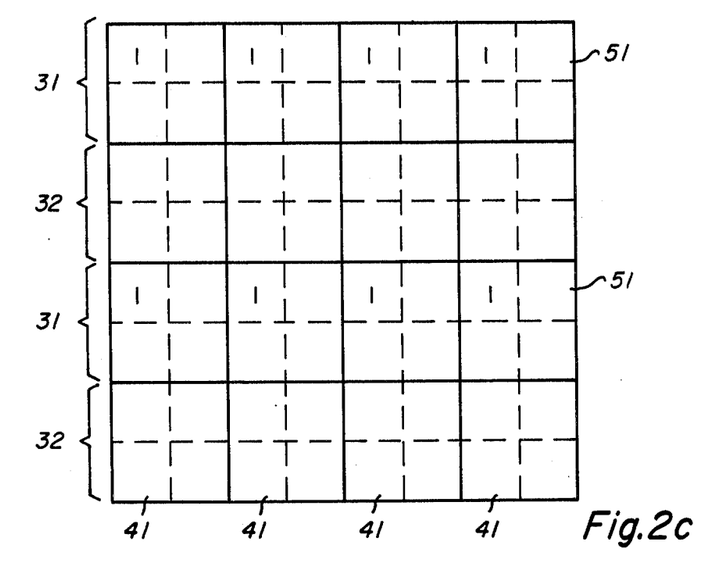

For the purpose of comparison, FIG. 2a illustrates the conventional method of transmitting television pictures. Each of the conventional U.S. television pictures is comprised of 525 scan lines, herein given reference numeral 30. These lines are divided into scan line set 31 containing alternate ones of scan lines 30, and scan line set 32 containing the remaining ones of scan lines 30. By comparison, in the disclosed method, each of the adjacent pairs of the conventional scan lines 30 are replaced with M new scan lines. FIG. 2b illustrates this step whereby each pair of the conventional lines 30 is replaced with four new scan lines. Accordingly, each frame of a picture is comprised of four scan line sets 51, 52, 53 and 54 as illustrated in FIG. 2b. This vertical subdivision of a frame may be extended in general such that each of the frames is divided into M scan line sets where $M \geq 2$. In the illustrated example, M is an even number; scan line set 51 includes lines 1, 1+M, 1+2M, ...; scan line set 52 includes lines 2, 2+M, 2+2M, . . . etc.

Also, in accordance with the invention, each of the M new scan lines is horizontally divided into a number of sample points. These are indicated in FIG. 2b via reference numeral 40. These sample points are spaced apart by time interval $T_s$ where $1/T_s \geq 2BW$. Sample points 40 are then subdivided into N horizontal interlace sets as previously described. In the example illustrated in FIG. 2b, the horizontal interlace sets are designated as 41 and 42.

Frames of pictures are transmitted by first transmitting the analog signals $f_k(t)$ formed from samples within one of the horizontal interlace sets and also within one of the scan line sets of 1 through M/2. Then the analog signals $f_k(t)$ formed from samples within the same horizontal interlace set and also within one of the scan line sets of M/2+1 through M are transmitted. FIGS. 2c–2f illustrate the steps of this preferred method on an example having four scan line sets and two horizontal interlace sets. In these figures, the reference numerals 1-8 indicate eight fields of sample points; and they also indicate the time sequence in which the fields are transmitted via analog signals $f_k(t)$. One such $f_k(t)$ signal is generated for each scan line; and the scan lines are transmitted sequentially from left to right and from top to bottom.

Figure 2D:
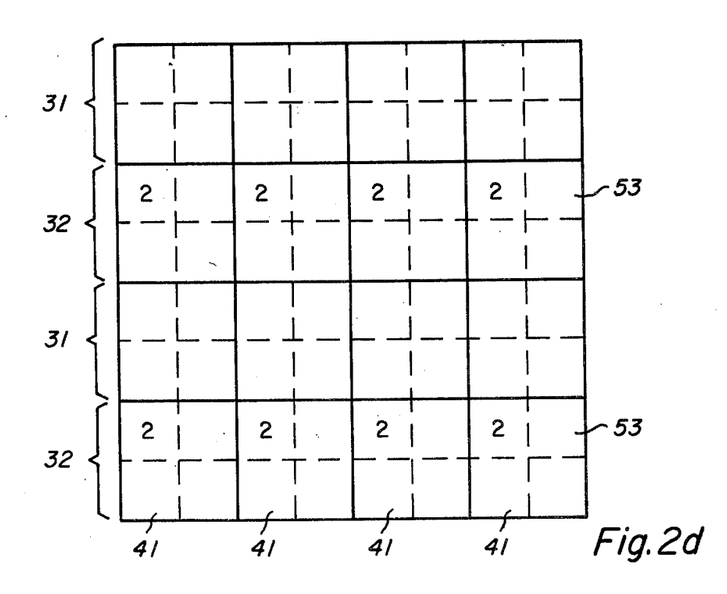
Figure 2E:
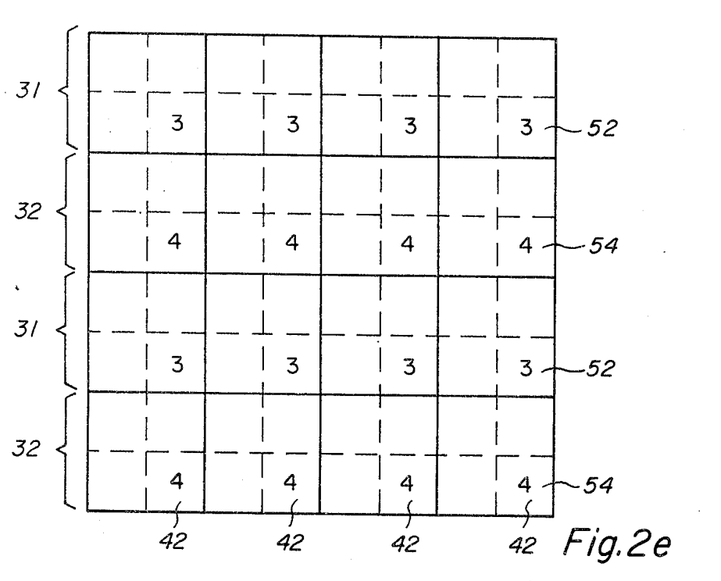
Figure 2F:
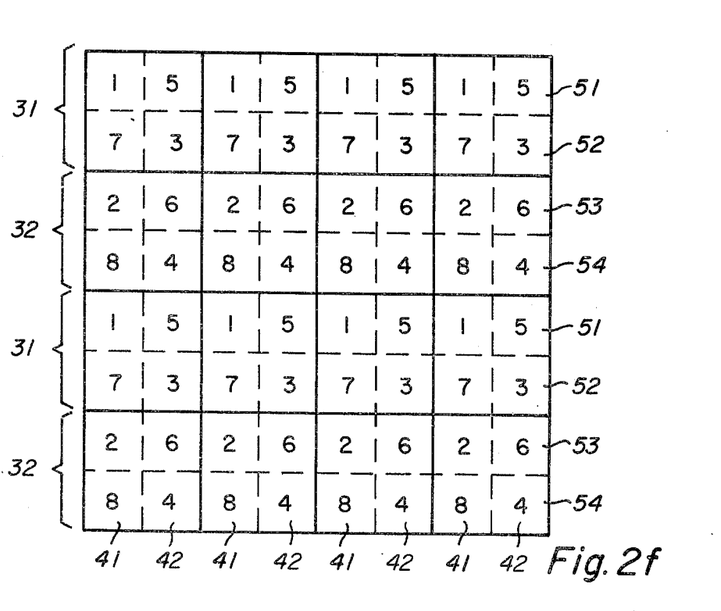

Accordingly, in the example illustrated, all of the sample points within horizontal interlace set 41 and scan line set 51 are first transmitted. This field of sample points is labeled 1 in FIG. 2c. Next, all of the sample points within horizontal interlace set 41 and scan line set 53 are transmitted. FIG. 2d indicates this field of sample points by reference numeral 2. Next, all of the sample points within horizontal interlace set 42 and scan line set 52 are transmitted. Then all of the sample points within horizontal interlace set 42 and scan line set 54 are transmitted. These sample points are illustrated in FIG. 2e as fields 3 and 4 respectively. The process continues by sequentially transmitting sample points of a particular horizontal interlace set from one of the scan line sets 51 or 52, and one of the scan line sets 53 or 54. The combinations of horizontal interlace sets and scan line sets are chosen such that all of the sample points in a picture are transmitted once for each frame. Then, the process is repeated to transmit additional frames. FIG. 2f illustrates one time sequence by which sample points are transmitted to send one frame of a picture.

High resolution television pictures may also be transmitted according to the invention by transmitting analog signals $f_k(t)$ which are formed by various other combinations of vertical scan line sets and horizontal interlace sets. These other combinations will be described shortly. The description will now turn to various methods for receiving high resolution television pictures which are transmitted via the analog signals $f_k(t)$. Basically, in order to receive these high resolution pictures, the process of transmission is reversed. That is, for each line of the high resolution picture, an analog video signal $f_k(t)$ having an amplitude at sample points $kT_s, kT_s+NT_s, kT_s+2NT_s, \ldots$ indicating the light intensity of the line at the sample points for one value of k is received. This analog signal is sampled at the sample points to obtain samples $s(kT_s)$, $s(kT_s+NT_s)$, $s(kT_s+2NT_s)$, . . . . By repeating the process for other values of k, frames are generated such that the light intensity at all the sample points within the frame is proportional to the amplitude of the respective samples.

Figure 3A:
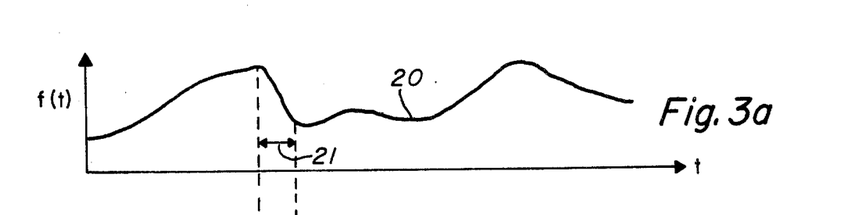
FIGS. 3a–3c are a set of timing diagrams illustrating the method of receiving pictures according to one preferred embodiment of the invention.
Figure 3B:
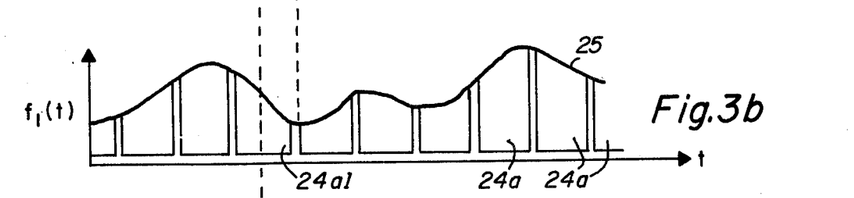
Figure 3C:
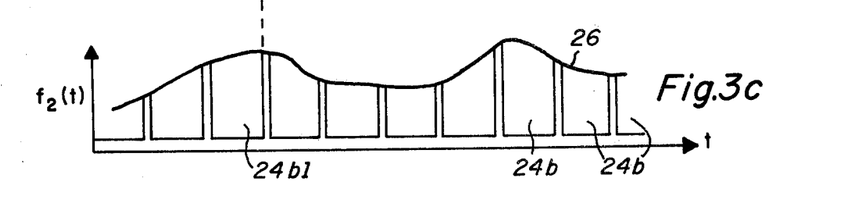

The above receiving process is illustrated in FIGS. 3a–3c as an example. In this example, the reversing of the transmission steps of FIGS. 1a–1i is illustrated. In particular, FIG. 3a illustrates the analog signal f(t) which is desired to be received. Reception of f(t) is accomplished in accordance with the invention by receiving during one time interval an analog signal $f_1(t)$ as illustrated in FIG. 3b; and by receiving during a second time interval an analog signal $f_2(t)$ as illustrated in FIG. 3c. During the time interval an analog signal $f_1(t)$ is received, the signal is sampled to recover sample points 24a which occur at times $T_s, 3T_s, 5T_s, \ldots$. Similarly, during the time interval in which analog signal $f_2(t)$ is received, the signal is sampled to recover sample points 24b which occur at $2T_s, 4T_s, 6T_s, \ldots$. The light intensity at each of these sample points on the corresponding scan line is generated in proportion to the amplitude of the respective samples.

The required summation of the two sub images is accomplished partially by the memory of the phosphorus of the display, and partially by the human eye. As a result, the brightness of the scene being displayed may quickly change from dark to light or vice versa. Note for example the steep slope which is illustrated as occurring during time interval 21 of FIG. 3a. This steep slope is generated in the receiving set by utilizing sample points 24a1 and 24b1. These sample points are transmitted during different time intervals, and thus the fact that they have an extremely large difference in amplitude does not give rise to high frequency components which cannot be transmitted.

The manner in which the light intensity at the sample points of the scan lines is made proportional to the magnitude of the respective samples may be accomplished in a variety of ways. For example, the horizontal sweep in a television set may be continuous, while the intensity of the electron beam is pulsed in accordance with the amplitude of the received samples. Utilizing this technique, the intensity of the horizontal sweep electron beam would be similar to the magnitudes of lines 25 and 26 of FIG. 3b and 3c respectively.

Alternatively, a nonpulsed continuous signal may be utilized to generate the light intensity of each line. In a preferred embodiment of this method, all of the samples for a particular scan line are recombined in their sequential order, and a new analog signal f'(t) is generated by passing this set of samples through an interpolating filter. A scan line is then generated having a light intensity proportional to the analog signal f'(t).

Figure 4A:
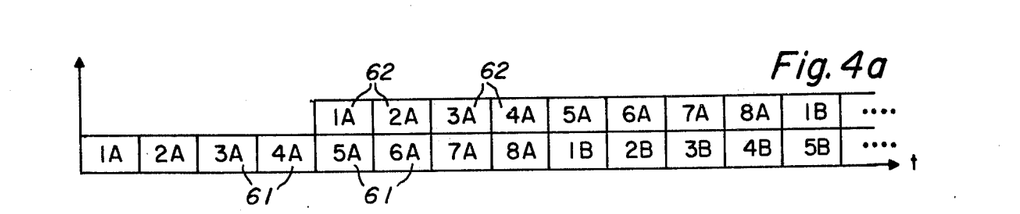
FIGS. 4a-4b are a set of diagrams illustrating the method of receiving pictures according to another preferred embodiment of the invention.
Figure 4B:
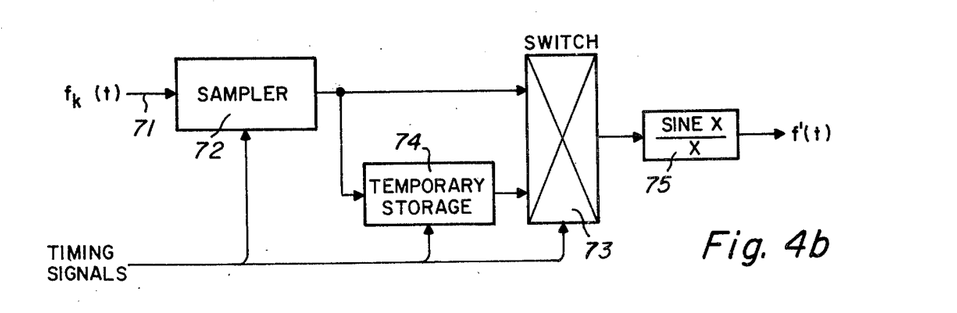

This method is illustrated in FIGS. 4a and 4b as an example. In this example, each frame of a picture is comprised of four vertical scan line sets and two horizontal interlace sets of sample points. This is the same frame structure that was illustrated in the transmission sequence of FIG. 2f. Referring first to FIG. 4a, there is illustrated a timing diagram indicating the sequence in which various samples are received in the television set. These sets of samples are indicated generally at 61. The reference numerals 1A, 2A, 3A, . . . indicate the time at which samples 1, 2, 3, . . . of FIG. 2f are received for the first frame. Similarly, the reference numerals 1B, 2B, 3B, . . . indicate the time at which samples 1, 2, 3, . . . of FIG. 2f are received for the second frame. Each of these samples is temporarily stored in the receiving set for one half frame time. The stored samples are indicated generally at 62. Thus, as FIG. 4a illustrates, the samples 1A are available in the receiving set at the time instant when samples 5A are being received. Samples 1A and 5A comprise all the samples of scan line set 51. Accordingly, samples 1A and 5A are recombined in the receiving set in consecutive order. Then analog signal f'(t) is formed from the recombined samples, and is utilized to control the light intensity of the scan lines for field 51. Similarly, sample points 2A are available in the receiving set when sample points 6A are being received. Sample points 2A and 6A comprise all the sample points within field 53. Thus, continuous analog signals f'(t) are generated from the sample points for each of the scan lines within vertical scan line set 53. The process is then repeated for scan line set 52 and scan line set 54.

A means for performing the steps of this process is indicated in block diagram form in FIG. 4b. As therein illustrated, the transmitted analog signals $f_k(t)$ are coupled via leads 71 to an input of a sampler 72. Sampler 72 samples signal $f_k(t)$ at the appropriate time instants to recover the samples $s(kT_s), s(kT_s+NT_s) \ldots$ contained therein. The output of the sampler couples to a 2 by 1 switch 73, and a temporary storage element 74. The output of storage element 74 couples to the second input of switch 73. An interpolating filter 75 couples to the output of the switch 73. In operation, sampler 72 supplies samples to the input of switch 73 and storage element 74. Storage element 74 delays the samples by ½ frame time. Switch 73 alternatively passes samples received from sampler 72 and storage element 74. Thus, switch 73 sequentially outputs samples $s(T_s), s(2T_s), s(3T_s) \ldots$ for each line. Interpolating filter 75 operates on these samples to generate analog signals f'(t) for each line which are proportional to the original signal f(t) from which the samples were generated.

In order to synchronize the the receiving steps illustrated in FIGS. 3a–3c and 4a, it is also necessary to transmit scan sequence identifiers. These signals will identify the horizontal interlace set and vertical scan line set of samples from which the analog video signal was generated. These identifiers can, of course, be incorporated into the vertical time interval of the transmission. Also, it is to be understood that the scope of the method for receiving high resolution pictures is not to be limited to the examples illustrated in FIGS. 3a–3c, 4a and 4b. The methods described in conjunction with these FIGURES apply equally well for receiving pictures comprised of various numbers of horizontal interlace sets and vertical scan line sets such as those to be described in conjunction with FIGS. 5-12 for example. Accordingly, the scope of the method described herein for receiving high resolution television pictures is to be limited only by the language of the claims.

An important aspect of the method described herein for transmitting/receiving high resolution television pictures is that the analog signals $f_k(t)$ are compatible for use with conventional low resolution television sets. In a conventional television set, the analog signals $f_k(t)$ are acted upon in the usual manner. That is, analog signals $f_k(t)$ are directly utilized to generate the light intensity of scan lines proportional to the amplitude of those signals. The effect is that a number of adjacent samples lying within similar portions of adjacent scan lines are recombined in an overlie fashion to form conventional low resolution pictures. This is illustrated, for example in FIG. 2f. In that FIGURE, samples 1, 3, 5, and 7, are recombined in a conventional television set to sequentially control the light intensity of the areas defined by the intersection scan line set 31 and horizontal interlace sets 41 and 42. Similarly, samples 2, 4, 6, and 8 are sequentially utilized to control the light intensity of the areas defined by scan line set 32 and horizontal interlace sets 41 and 42. Accordingly, no special adaption circuitry is required in conventional television sets in order for them to be operable with the analog video signals $f_k(t)$ described herein.

Figure 7:
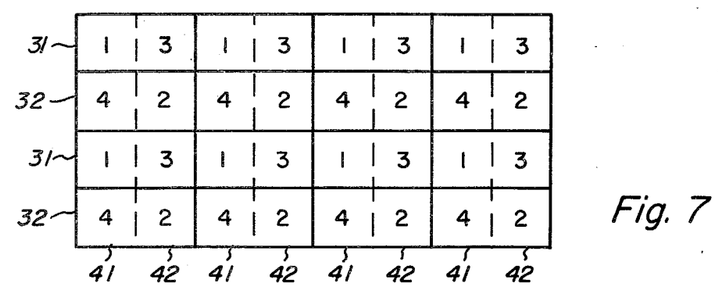
FIG. 7 is a diagram illustrating the method of transmitting frames of pictures according to a fourth preferred embodiment of the invention.
Figure 8:
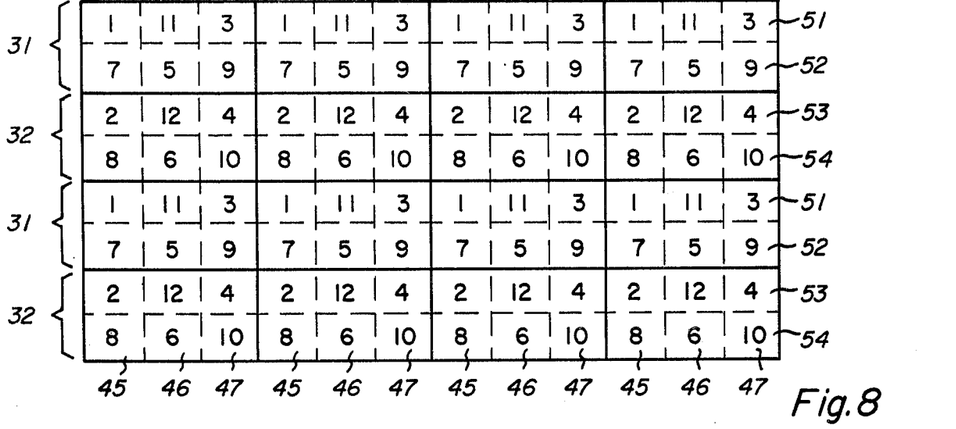
FIG. 8 is a diagram illustrating the method of transmitting television pictures according to a fifth preferred embodiment of the invention.
Figure 9:
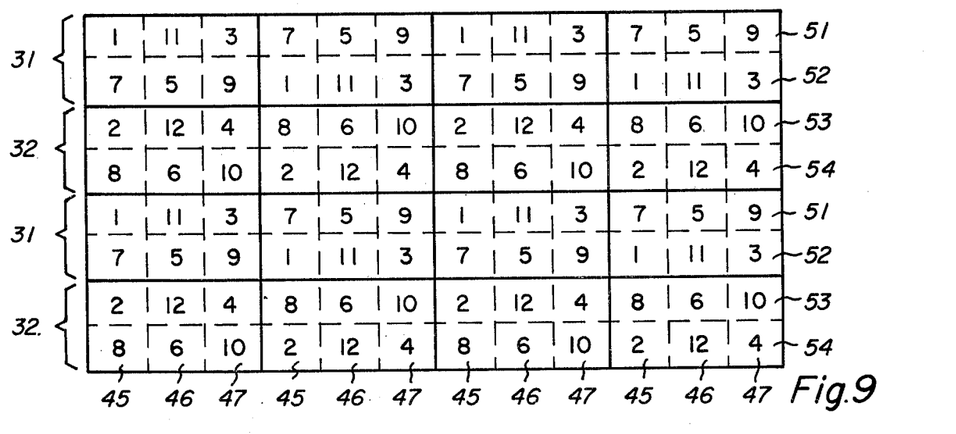
FIG. 9 is a diagram illustrating the method of transmitting television pictures according to the sixth preferred embodiment of the invention.

Various other methods for transmitting high resolution television pictures according to the invention will now be described in conjunction with FIGS. 5-12. These figures illustrate a portion of a television frame, and indicate how the frame is divided into horizontal interlace sets and vertical scan sets to form fields of a plurality of samples numbering as high as 1-12 (FIGS. 8 and 9). Also, as before in conjunction with FIG. 2f, the sample numerals indicate the time sequence in which the corresponding fields of the samples are transmitted via analog signals $f_k(t)$. The analog signals $f_k(t)$ are utilized in a high resolution television to recover the samples $s(T_s), s(2T_s), s(3T_s), \ldots$ to form a high resolution television picture, and are utilized in a conventional low resolution television to form a conventional television picture as described above.

Figure 5:
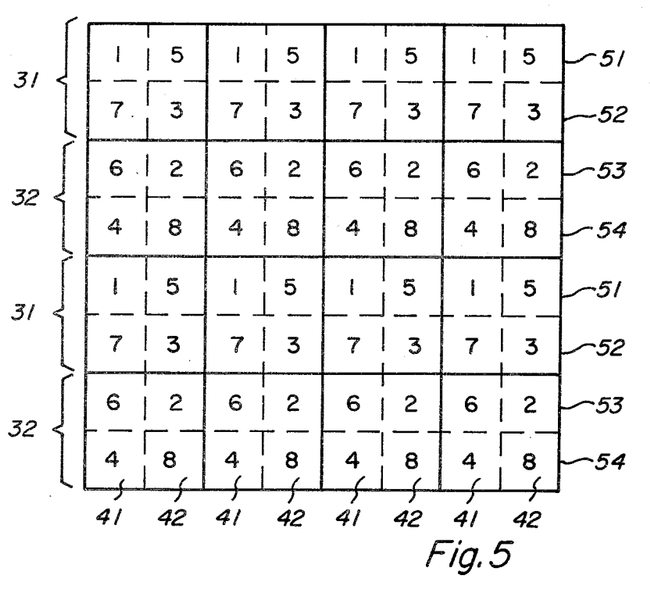
FIG. 5 is a diagram illustrating the method of transmitting frames of pictures according to a second preferred embodiment of the invention.

Referring now to FIG. 5, there is illustrated a method of transmitting pictures according to the invention wherein frames are transmitted by first transmitting analog signals $f_k(t)$ formed from samples of one of the horizontal interlace sets for all the lines within one of the scan line sets of 1 through M/2. Then analog signals $f_k(t)$ formed from samples of a different horizontal interlace set for one of the scan line sets of M/2+1 through M are transmitted. FIG. 5 illustrates the steps of this preferred method on an example having two horizontal interlace sets and four scan line sets, as did the preceding example of FIG. 2. Again, the reference numerals 1-8 indicate the time sequence in which various fields of the samples 40 are transmitted via the analog signals $f_k(t)$.

In the example illustrated, all of the sample points within horizontal interlace set 41 and scan line set 51 are first transmitted. Then the sample points within horizontal interlace set 42 and scan line set 53 are transmitted. These two fields are labeled in FIG. 5 as 1 and 2, respectively. Next the sample points within horizontal interlace set 42 and scan line set 52 are transmitted. Then the sample points within horizontal interlace set 41 and scan line set 54 are transmitted. These points are respectively labeled fields 3 and 4 in FIG. 5. The process continues with sample points within fields 5, 6, 7, and 8 being transmitted in a time sequence as illustrated in FIG. 5. Additional frames are transmitted by repeating the entire process.

In still another method of transmitting high resolution television pictures according to the invention, the indexing value of "k" for the analog signals $f_k(t)$ is changed as the various scan lines within a scan line set are transmitted. This method is illustrated in FIG. 6 on an example which again has two horizontal interlace sets and four scan line sets. Again, the reference numerals 1-8 indicate the time sequence in which fields of the samples 40 are transmitted via the analog signals $f_k(t)$. Also, the scan lines are again transmitted sequentially from left to right and from top to bottom.

Figure 6:
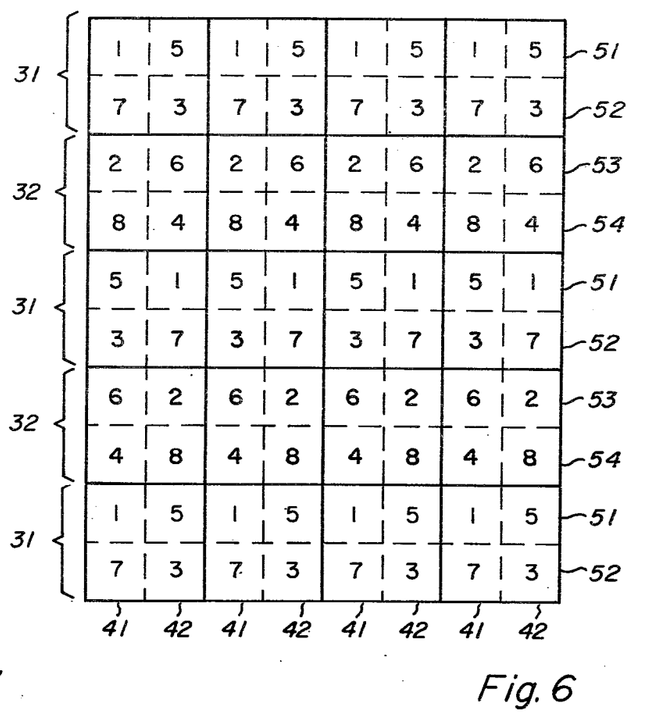
FIG. 6 is a diagram illustrating the method of transmitting frames of pictures according to a third preferred embodiment of the invention.

Accordingly, as illustrated in FIG. 6, the analog signal $f_k(t)$ which is transmitted for the first scan line is comprised of samples from horizontal interlace set 41 and scan line set 51. Next an analog signal is transmitted for the third scan line which is comprised of sample points from horizontal interlace set 42 and scan line set 51. Then an analog signal for scan line 5 is transmitted which is comprised of sample points from horizontal interlace set 41 and scan line set 51. This sequence continues until an analog signal for the last scan line of scan line set 51 is transmitted. Then, the steps are repeated utilizing sample points from scan line set 53 and horizontal interlace sets 41 and 42. After an analog signal has been transmitted for the last scan line of scan line set 53, the process is then repeated utilizing sample points first within scan line set 52, and then within scan line set 54. Reference numerals 1-4 of FIG. 6 illustrate this portion of the method. Then the sequence described above continues until each of the sample points in a frame are transmitted. These steps are indicated by reference numerals 5-8 in FIG. 6. The entire process is then repeated to transmit additional frames.

All of the examples illustrated up to this point transmitted frames comprised of four scan line sets and two horizontal interlace sets. By comparison FIG. 7 illustrates the method for transmitting the high resolution television pictures according to the invention on an example where each frame is comprised of two horizontal interlace sets and two scan line sets. The two horizontal interlace sets of samples are herein labeled 41 and 42 respectively; and the two scan line sets are herein labeled 31 and 32 respectively. Reference numerals 1-4 indicate the fields into which the sample points of FIG. 7 are divided. Also, as before reference numerals 1-4 indicate the time sequence of field transmission.

FIG. 8 illustrates, as an example, another method of transmitting high resolution television pictures according to the invention wherein frames are comprised of three horizontal interlace sets. These horizontal interlace sets are indicated in FIG. 8 via reference numerals 45, 46, and 47. By transmitting the samples 40 indicated in FIG. 8, the resulting picture has a higher resolution than the picture obtained from any of the preceding examples. This is because the picture indicated in FIG. 8 contains more sample points per unit area. FIG. 8 also illustrates one sequence in which the samples can be transmitted via the analog signals $f_k(t)$. The reference numerals 1-12 indicate the time sequence for transmitting the samples via the analog signals $f_k(t)$. Thus, as illustrated in FIG. 8, the sample points of field 1, which are transmitted first, are defined by horizontal interlace set 45 and scan line set 51. Then the samples contained with horizontal interlace set 45 and scan line set 53 are transmitted. The process continues until each of the sample points comprising one frame are transmitted; and additional frames are transmitted by repeating the entire process.

FIG. 9 illustrates as an example, still another method of transmitting high resolution television pictures according to the invention wherein each of the analog signals $f_k(t)$ is formed by sampling several predetermined ones of the M new scan lines to obtain samples $s(kT_s)$, $s(kT_s+NT_s)$, $s(kT_s+2NT_s)$, .... By comparison, in each of the preceding methods which have been described, each of the analog signals $f_k(t)$ was generated from samples obtained from only one of the M new scan lines. In the example illustrated in FIG. 9, each frame is comprised of three horizontal interlace sets 45, 46, and 47; and four vertical scan line sets 51-54. Again, the reference numerals 1-12 indicate various fields of sample points and the time sequence for transmitting them via the analog signals $f_k(t)$. Thus, as illustrated in FIG. 9, the analog signals $f_k(t)$ which are first transmitted as the video signal of the scan line set 31 are comprised of sample points lying within horizontal interlace set 45 and alternately lying within vertical scan line sets 51 and 52. Similarly, the analog signals $f_k(t)$ which are next transmitted as the video signal of scan line set 32 are comprised of sample points lying within horizontal interlace set 45 and alternately within vertical scan line sets 53 and 54. In general, the method indicated in FIG. 9 may be expanded such that each adjacent pair of the original scan lines 31 and 32 is replaced with M new scan lines where M is an even integer $\geq 2$. Analog signals $f_k(t)$ are then generated as a video signal for scan line set 31 by sampling predetermined ones of new scan lines 1 through M/2. Similarly, analog signals $f_k(t)$ for scan line set 32 are generated by sampling predetermined ones of new scan lines M/2+1 through M. The example illustrated in FIG. 9, illustrates only one example of this method where M=4.

Figure 10:
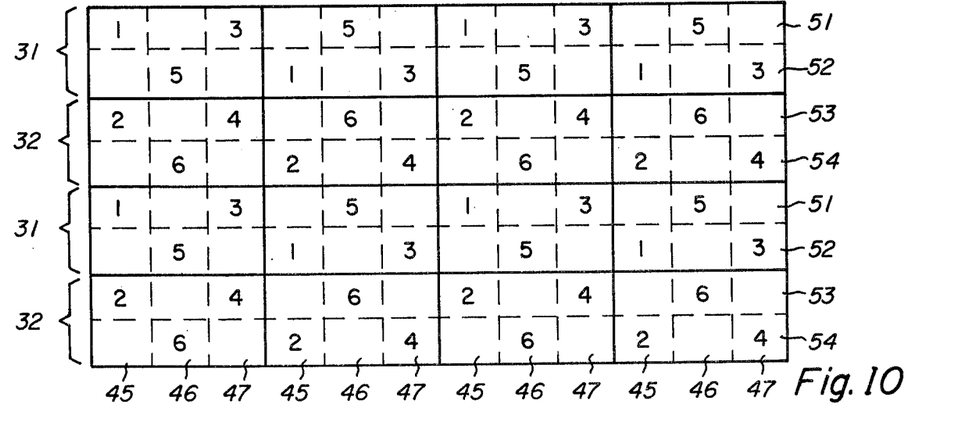
FIG. 10 is a diagram illustrating the method of transmitting television pictures according to the seventh preferred embodiment of the invention.

Still another method of transmitting high resolution television pictures according to the invention is illustrated in FIG. 10. As therein illustrated, each frame is divided into a number of horizontal interlace sets, and a number of vertical scan lines sets; however, only one-half of the resulting sample points are transmitted per frame. Those samples which are transmitted are selected to form a checker-board type pattern as illustrated in FIG. 10.

As a result, the picture has both improved resolution and a high rate of frame transmission. The frame transmission rate for the method illustrated in FIG. 10, for example, is twice that of the method of FIG. 9. The light intensity of the sample points which are not transmitted via the method of FIG. 10 is interpolated partially by the human eye and partially by whatever technique is utilized to display the frames. For example, a high resolution television set may pass the received samples through an interpolating filter to generate a continuous analog signal having an amplitude at the sample points proportional to the magnitude of the recovered samples and having a magnitude between sample points proportional to a linear or non-linear interpolation of the adjacent samples.

Figure 11:
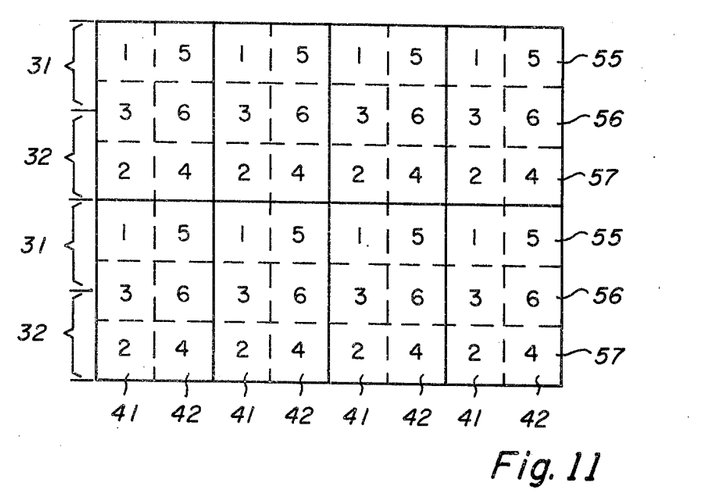
FIG. 11 is a diagram illustrating the method of transmitting television pictures according to a eighth preferred embodiment of the invention.

FIG. 11 illustrates still another example of transmitting high resolution television pictures according to the invention wherein adjacent pairs of the original scan lines 31 and 32 are replaced with M new scan lines where M is an odd number. In the example illustrated, M equals 3. By comparison, all of the preceding examples replaced adjacent pairs of the original scan lines with an even number of M new scan lines.

Accordingly, in the example illustrated in FIG. 11, the analog signals $f_k(t)$ which are transmitted as a video signal of scan line set 31, are first comprised of samples included within horizontal interlace set 41 and vertical scan line set 55. Then video signals of scan line set 32 are transmitted via analog signals $f_k(t)$ which are comprised of samples from horizontal interlace set 41 and vertical scan line set 57. Next video signals of scan line set 31 are transmitted via analog signals $f_k(t)$ which are comprised of samples from horizontal interlace set 41 and vertical scan line set 56. The process continues as indicated in FIG. 11 until all of the sample points in the frame are transmitted. Note that whenever a sample from vertical scan line set 56 is included within analog signal $f_k(t)$, a high resolution television set will recover the samples and utilize them to form pictures as indicated in FIG. 11, whereas conventional television sets will transpose the sample point to either scan line 31 or scan line 32.

Also, it is clear from the example illustrated in FIG. 11, that sample points within field 1 may be selected from horizontal interlace set 41 or 42, and vertical scan line sets 55 and 56; while sample points within field 2 may be selected from horizontal interface set 41 or 42 and vertical scan line sets 56 or 57. Similarly, sample points within field 3 may be selected from horizontal interlace set 41 or 42 and vertical scan line sets 55 and 56; while sample points within field 4 may be selected from horizontal interlace sets 41 or 42 and vertical scan line sets 56 and 57. Thus, the method indicated in FIG. 11 may be expanded in general such that an analog singal $f_k(t)$ is transmitted for each pair of the original adjacent scan lines wherein the samples utilized to form analog signals $f_k(t)$ are comprised of predetermined ones of the scan lines 1 through $(M+1/2)$. Then the steps are repeated such that the samples from which the analog signals $f_k(t)$ are comprised are taken from predetermined ones of the new scan lines $(M+1)/2$ through M. These steps are repeated a total of $M \times N/2$ times for each frame of pictures transmitted such that samples $s(T_s)$, $s(2T_s)$, $s(3T_s)$, . . . for all of the new scan lines are transmitted for each frame.

Figure 12:
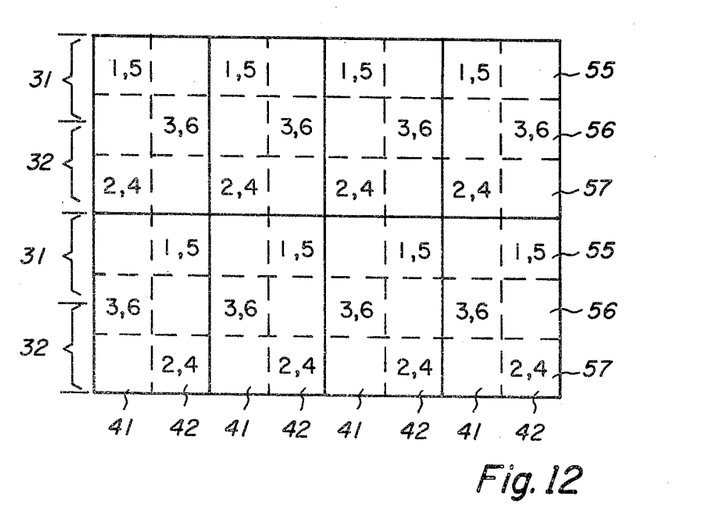
FIG. 12 is a diagram illustrating the method of transmitting television pictures according to the ninth preferred embodiment of the invention.

Still another method of transmitting high resolution television pictures according to the invention is illustrated in FIG. 12, wherein the number of vertical scan line sets is odd and only one-half of the samples which are formed by the vertical scan line sets and horizontal interlace sets are transmitted per frame. Again, those samples which are transmitted form a checker-board pattern. This pattern is illustrated by fields 1–6 in FIG. 12 as an example. Also, it is clear from what has been described to this point, that each of the fields 1–6 may be comprised of sample points other than those chosen in the example. It is worth pointing out however, that in order to show one complete sequence for transmitting sample points, it is necessary to designate six fields as opposed to three fields. This is because the analog signals $f_k(t)$ formed from the fields must be capable of being alternately interpreted by conventional television sets as video signals for scan line sets 31 and 32.

Various specific examples for transmitting and receiving high resolution television pictures have now been described in detail. Since many changes and modifications can be made in the above details without departing from the nature and spirit of the invention, it is understood that the invention is not to be limited to said details except as set forth in the appended claims.

What is claimed is:

1. In a television system having a channel bandwidth BW and a predetermined number $N_0$ of scan lines per frame, a method of transmitting high resolution television pictures having frequency components from 0 to $f_{max}$ where $f_{max} > BW$ comprising the steps of:
   (a) replacing one adjacent pair of said $N_0$ scan lines of said frame with M new scan lines, where M is any integer $\geq 2$;
   (b) sampling predetermined ones of said M new scan lines to obtain samples $s(kT_s)$, $s(kT_s+NT_s)$, $s(kT_s+2NT_s)$, . . . where N is any integer for which $BW \geq f_{MAX-N}$, K is any integer between 1 and N, $T_s$ is the time interval between successive samples, and $1/T_s \geq 2f_{MAX}$;
   (c) generating an analog signal $f_k(t)$ having an amplitude at the sample points $kT_s$, $kT_s+NT_s$, $kT_s+2NT_s$, . . . equal to the amplitude of said samples $s(kT_s)$, $s(kT_s+NT_s)$, $s(kT_s+2NT_s)$, . . . respectively, and having a bandwidth of $\leq BW$; and
   (d) transmitting said $f_k(t)$ signal as the video signal of one of the $N_0$ scan lines included within said one adjacent pair and simultaneously as a high resolution video signal indicating samples $s(kT_s)$, $s(kT_s+NT_s)$, $s(kT_s+2NT_s)$, . . . within said predetermined ones of said M new scan lines.

2. A method according to claim 1 wherein said samples of step (b) are obtained by electronically generating all of the samples $s(T_s)$, $s(2T_s)$, $s(3T_s)$, . . . for each of said M new scan lines and electronically selecting the $k_{th}$, $(k+N)_{th}$, $(k+2N)_{th}$ . . . samples of said predetermined ones of said M new scan lines.

3. A method according to claim 1 wherein said samples are obtained by electronically sampling said predetermined ones of said M new scan lines at a frequency $1/NT_s$ and selectively starting said sampling at $kT_s$.

4. A method according to claim 1 and further including the steps of:
   (e) performing steps (a) through (d) once on each adjacent pair of said $N_o$ scan lines of said frame.

5. A method according to claim 4 and further including the steps of:
(f) repeating step (e) a total of M×N times for each frame of said pictures such that samples $s(T_s)$, $s(2T_s)$, $s(3T_s)$, ... for all of said new scan lines of said frame are transmitted.

6. A method according to claim 1 wherein M is an even number and further including the steps of:
(e) performing steps (a) through (d) once on each adjacent pair of said $N_o$ scan lines of said frame where said predetermined ones of said M new scan lines of step (b) are limited to new scan lines 1 through M/2; and then performing steps (a) through (d) once on each adjacent pair of said $N_o$ scan lines of said frame where said predetermined ones of said M new scan lines of step (b) are limited to new scan lines [(M/2)+1] through M.

7. A method according to claim 6 and further including the step of:
(f) repeating step (e) a total of M×N/2 times for each frame of said pictures such that samples $s(T_s)$, $s(2T_s)$, $s(3T_s)$, ... for all of said new scan lines of said frame are transmitted.

8. A method according to claim 6 further including the step of:
(f) repeating step (e) a total of M×N/4 times for each frame of said pictures such that samples $s(T_s)$, $s(3T_s)$, $s(5T_s)$, ... for alternate ones of said new scan lines are transmitted, and samples $s(2T_s)$, $s(4T_s)$, $s(6T_s)$, ... for the remaining new scan lines are transmitted.

9. A method according to claim 1 where M is an odd number and further including the steps of:
(e) performing steps (a) through (d) once on each adjacent pair of said $N_o$ scan lines of said frame where said predetermined ones of said M new scan lines of step (b) are limited to new scan lines 1 through (M+1)/2, and then performing steps (a) through (d) once on each adjacent pair of said $N_o$ scan lines of said frame where said predetermined ones of said M new scan lines of step (b) are limited to new scan lines (M+1)/2 through M.

10. A method according to claim 9 and further including the step of:
(f) repeating step (e) a total of M×N/2 times for each frame of said pictures such that samples $s(T_s)$, $s(2T_s)$, $s(3T_s)$, ... for all of said new scan lines of said frame are transmitted.

11. A method according to claim 9 further including the step of:
(f) repeating step (e) a total of M×N/4 times for each frame of said pictures such that samples $s(T_s)$, $s(3T_s)$, $s(5T_s)$, ... for alternate ones of said new scan lines are transmitted, and samples $s(2T_s)$, $s(4T_s)$, $s(6T_s)$, ... for the remaining new scan lines are transmitted.

12. In a television system having a channel bandwidth BW, a method of receiving high resolution television pictures, said pictures being comprised of a plurality of frames, each of said frames being comprised of M vertical scan line sets, and said scan line sets being comprised of scan lines having frequency components from 0 to $f_{MAX}$ where $f_{MAX} \geq$ BW comprising the steps of:
(a) receiving an analog video signal $f_k(t)$ having an amplitude at sample points $kT_s$, $kT_s+NT_s$, $kT_s+2NT_s$, ... indicating the light intensity of said sample points of predetermined ones of M adjacent scan lines within said frame, where M is any integer $\geq 2$, k is an integer between 1 and N, $N \geq f_{MAX} \div$ BW, $T_s$ is the time interval between successive samples, and $1/T_s \geq 2f_{MAX}$;
(b) sampling said $f_k(t)$ signal at said sample points to obtain samples $s(kT_s)$, $s(kT_s+NT_s)$, $s(kT_s+2NT_s)$, ...; and
(c) generating the light intensity at said sample points along said predetermined ones of said M adjacent scan lines proportional to the amplitude of the respective samples.

13. A method according to claim 12 and further including the step of:
(d) performing steps (a) through (c) once on each group of M adjacent scan lines of said frame.

14. A method according to claim 13 and further including the step of:
(e) repeating step (d) a total of M×N times for each frame of said pictures such that samples $s(T_s)$, $s(2T_s)$, ... for all of said scan lines of said frame are received.

15. A method according to claim 14 wherein said samples are temporarily stored after they are received, and selected ones of said temporarily stored samples are combined with selected ones of the samples being received to form an analog signal indicating the light intensity at all the sample points along ones of said scan lines.

16. A method according to claim 12 wherein M is an even number and further including the step of:
(d) performing steps (a) through (c) once on each group of M adjacent scan lines of said frame where said predetermined ones of said M adjacent scan lines of step (a) are limited to scan lines 1 through M/2; and then performing steps (a) through (c) once on each group of M adjacent scan lines of said frame where said predetermined ones of said M adjacent scan lines of step (a) are limited to scan lines [(M/2)+1] through M.

17. A method according to claim 16 and further including the steps of:
(e) repeating step (d) a total of M×N/2 times for each frame of said pictures such that samples $s(T_s)$, $s(2T_s)$, $s(3T_s)$, ... for all of said scan lines of said frame are received.

18. A method according to claim 16 further including the step of:
(e) repeating step (d) a total of M×N/4 times for each frame of said pictures such that samples $s(T_s)$, $s(3T_s)$, $s(5T_s)$, ... for all alternate ones of said scan lines are received, and samples $s(2T_s)$, $s(4T_s)$, $s(6T_s)$, ... for the remaining scan lines are received.

19. A method according to claim 12 where M is an odd number and further including the step of:
(d) performing steps (a) through (c) once on each group of M adjacent scan lines of said frame where said predetermined ones of said M adjacent scan lines of step (a) are limited to scan lines 1 through (M+1)/2, and then performing steps (a) through (c) once on each group of M adjacent scan lines of said frame where said predetermined ones of said M adjacent scan lines of step (a) are limited to scan lines (M+1)/2 through M.

20. A method according to claim 19 and further including the step of:
(e) repeating step (d) a total of M×N/2 times for each frame of said pictures such that samples $s(T_s)$, $s(2T_s)$, $s(3T_s)$, ... for all of said scan lines of said frame are received.

21. A method according to claim 19 further including the step of:
(e) repeating step (d) a total of $M \times N/4$ times for each frame of said pictures such that samples $s(T_s)$, $s(3T_s)$, $s(5T_s)$, ... for alternate ones of said scan lines are received, and samples, $s(2T_s)$, $s(4T_s)$, $s(6T_s)$, ... for the remaining scan lines are received.

* * * * *